(12) United States Patent
Wold

(10) Patent No.: US 6,290,927 B1
(45) Date of Patent: Sep. 18, 2001

(54) METHOD FOR THE REMOVAL OF UNWANTED COLOR FROM HYDROCHLORIC ACID

(75) Inventor: Ragnar Wold, Porsgrunn (NO)

(73) Assignee: Norsk Hydro A/S, Oslo (NO)

( * ) Notice: Subject to any disclaimer, the term of this patent is extended or adjusted under 35 U.S.C. 154(b) by 767 days.

(21) Appl. No.: 08/586,874

(22) PCT Filed: May 31, 1995

(86) PCT No.: PCT/NO95/00085

§ 371 Date: Jan. 24, 1996

§ 102(e) Date: Jan. 24, 1996

(87) PCT Pub. No.: WO95/33680

PCT Pub. Date: Dec. 14, 1995

(30) Foreign Application Priority Data

Jun. 3, 1994 (NO) .................................... 942074

(51) Int. Cl.$^7$ ........................................ C01B 7/07
(52) U.S. Cl. ................................ 423/488; 423/481
(58) Field of Search ....................... 423/488, 481

(56) References Cited

U.S. PATENT DOCUMENTS

| 1,770,010 | * | 6/1930 | Payman et al. | 423/488 |
| 2,787,523 | * | 4/1957 | Wilson | 423/488 |
| 2,787,525 | * | 4/1957 | De Witt | 423/488 |
| 3,855,400 | * | 12/1974 | Paolieri et al. | 423/488 |
| 4,349,525 | * | 9/1982 | Yamashita et al. | 423/488 |

FOREIGN PATENT DOCUMENTS

| 2-233503 | * | 9/1990 | (JP) | 423/488 |
| WO95/17344 | | 6/1995 | (WO) . | |

OTHER PUBLICATIONS

Translation of JP 2–233,503 (Sep. 1990).*
Aldrich catalogue, 1990 (no month), p. 713.*

* cited by examiner

Primary Examiner—Ngoc-Yen Nguyen
(74) Attorney, Agent, or Firm—Wenderoth, Lind & Ponack, L.L.P.

(57) ABSTRACT

A method of removing iron and halogen coloring materials from hydrochloric acid, by removing iron from the hydrochloric acid, and thereafter adding a nitrogen containing reducing agent to the hydrochloric acid.

5 Claims, No Drawings

METHOD FOR THE REMOVAL OF UNWANTED COLOR FROM HYDROCHLORIC ACID

BACKGROUND OF THE INVENTION

1. Field of the Invention

The production of hydrochloric acid by destruction of chlorinated hydrocarbons yields a product that is coloured yellow, caused by, among other things, the presence of iron, free bromine and free chlorine. Such an acid has small industrial application and is of low value. To increase the value it is therefore necessary to remove this colour from the acid in a simple and cheap way.

2. Description of the Prior Art

In earlier known methods to remove these types of compounds from hydrochloric acid. U.S. Pat. No. 4,349,525 describes a method for purification of hydrochloric acid that is produced by a reaction between alkali chloride and sulfuric acid. It was found that the colour was caused by $Br_2$ and that simultaneous removal of $SO_2$ also resulted in a decrease in the colour level. According to this patent, the acid is purified by stripping with inert gas and oxygen. A colourless acid was obtained. However, this is an expensive process as a stripping tower and the supply of a sufficient amount of inert gas/oxygen is needed.

European patent application No. 0 506 050 discloses a method for the removal of fluorine, bromine, iodine and their hydrogen compounds, from hydrochloric acid. This is carried out by a first removal of HF and fluorides by the addition of a stoichlometric excess of a chlorine salt that can be dissolved, which leads to precipitation of their fluoride compounds. Thereafter the acid is distilled. To remove $Br_2$, I, bromides and iodides, chlorine is added in such amounts that elementary bromine or iodine is formed and thereafter is removed by stripping with water vapor. This is a very comprehensive and expensive process step.

SUMMARY OF THE INVENTION

The object of the invention is to find a method that removes colouring matter efficiently, is cheap, easy to handle and is safe for inner and outer environment and that will not result in unwanted reaction products in the treated acid.

These and other objects of the invention are obtained by the method and use as described below. The invention is further defined and characterized by the accompanying patent claims.

Thus, the present invention is directed to a method of removing iron and halogens from hydrochloric acid, which comprises removing iron from the hydrochloric acid, and thereafter adding a nitrogen containing reducing agent to the hydrochloric acid.

DESCRIPTION OF THE PREFERRED EMBODIMENTS

The invention concerns a method for the removal of colouring material as iron and halogens from hydrochloric acid. Among the halogens it is especially chlorine and bromine that contribute to the colour. Iron is first removed from the hydrochloric acid, preferably by filtration and ion exchange, and thereafter a nitrogen containing reduction agent is added to the acid. It is preferred to use compounds comprising hydroxyl amine, preferably hydroxylamine hydrochloride (hydroxyl ammonium chloride). The reducing agent is preferably supplied in a stoichiometric excess.

Iron is first removed from the acid, for example by filtration and ion exchange. An analysis of the produced hydrochloric acid showed that the main source for the yellow colour after the removal of iron, was halogens free chlorine and bromine. It was found that it was possible to reduce the surplus of free chlorine and bromine by adding a reducing agent.

The following properties must be fulfilled if a reducing agent shall be acceptable:

1. High efficiency. The compound ought to react as efficiently as possible with chlorine and bromine.
2. Low price.
3. Easy to handle. The compound should be pumpable or easily made pumpable (soluble in water).
4. No unnecessary danger to safety, work environment and outer environment.
5. No unwanted reaction products in the hydrochloric acid.

These demands resulted in a search for possible candidates among simple compounds with low molecular weight. They could not comprise poisonous elements. Several nitrogen containing reduction agents were considered. Among actual compounds the following can be mentioned: organic amines, hydrazine and compounds containing hydroxyl amine (hydroxyl ammonium). The most active compounds were hydrazine and hydroxylamine. Hydrazine will be active, but is environmental alarming. It was found that hydroxylamine satisfies all these demands. Hydroxylamine in the form of hydroxylamine hydrochloride was found to be a useful product and is used in the examples.

Hydroxylamine in hydrochloric acid will occur in the form of the hydroxylammonium ion $H_3NOH^+$. The most probable reactions between the free halogens and hydroxylamine are the following, where reaction 1 is dominant:

1. $2H_3NOH^+ + Cl_2 = N_2 + 2Cl^- + 4H^+ + 2H_2O$

2. $2H_3NOH^+ + 2Cl_2 = 2HNO + 4Cl^- + 6H^+ = N_2O + 4Cl^- + 6H^+ + H_2O$

A surplus of hydroxylamine will probably disproportion to $N_2O$ and $NH_4^+$ after the reaction:

$4H_3NOH^+ = 2NH_4^+ + N_2O + 3H_2O + 2H^+$

The components resulting in colour will thus be reduced to chloride and bromide, which are colourless. Reduction experiments were carried out to find if the reagent removes the colour of the acid and to which extent. It was also necessary to examine how large the amount of reagent consumed was.

The colour numbers of the hydrochloric acids were determined with LOVIBOND 2000 Tintometer (comparator). The colouring extent is given in Hazen.

EXAMPLE 1

Laboratory experiments were carried out. Clear, colourless glass bottles were used with a sample volume of 200 ml. The temperature was 20–22° C. and the bottles were not protected against light during the experiments. There was added 3 mmol hydroxylamine hydrochloride per liter hydrochloric acid. This corresponds to 200.5 mg $H_3NOHCl$. The hydrochloric acid had a specific weight of about 1.16 and contained 110 ppm halogens calculated as chlorine. The results are shown in Table 1.

TABLE 1

| Acid | Time after supply of $H_3NOHCl$ | Colour number Hazen |
|---|---|---|
| HCl HRA | | 100–125 |
| HCl HRA + $H_3NOHCl$ | 10 minutes | 175–200 |
| " | 30 minutes | 225 |
| " | 50 minutes | 150 |
| " | 80 minutes | 70 |
| " | 155 minutes | 30–40 |
| " | 1 day and night | 15–20 |
| " | 3 days and nights | 15–20 |
| " | 4 days and nights | 15–20 |
| " | 5 days and nights | 15–20 |
| " | 6 days and nights | 15–20 |

As can be seen from the table, the colour is reduced from 100–125 Hazen to 15–20 Hazen during 1 day and night at 20° C. It can also be seen that the colouring extent is substantially increased during the first half hour after supply of the reducing agent.

With basis in these laboratory experiments tests were carried out in full scale. These however, did not give the expected results. The acids was not clear and colourless when hydroxylamine was supplied.

Several tests therefore were carried out. About 10 l HCl was brought in from the production site and used for all the experiments. The following analysis were carried out before the experiments started. The results are shown in Table 2.

TABLE 2

| % HCl | Chlorine | Fe | Colour | TSS* |
|---|---|---|---|---|
| 33.05 | 97 ppm | 0.56 ppm | 100 Hazen | 2 ppm |

*Total Suspended Solids

EXPERIMENT 2

The temperature dependency had to be examined. A sample of hydrochloric acid was cooled to 0° C. and 6.3 ml of a 25% solution of hydroxylamine hydrochloride to 100 ml acid was added. This corresponds to 750 mg/l acid. The sample was put back in the refrigerator at the same temperature and the colour was measured after 30 minutes and 60 minutes. The sample was completely colourless after 60 minutes. Halogens were analyzed to <1 ppm by a iodometric method. After storage at the same temperature this sample was still colourless after 9 days and nights.

The same experiment was carried out at 22° C., with the result that the acid was colourless after 30 minutes. The content of the halogens was analyzed to <1 ppm.

Both temperatures gave the same result, a colourless acid, but the time necessary to obtain a colourless acid decreases with increasing temperature.

It was also important to have a good mixing of the reducing agent and sample to get an effect quickly.

EXPERIMENT 3

Reduction agent (hydroxylamine hydrochloride) was added to the acid under stirring in 4 different concentration levels, 187 mg/l, 375 mg/l, 750 mg/l and 1000 mg/l. The colour was measured in intervals of 5 minutes the first 30 minutes, with 10 minutes intervals the next 30 minutes and thereafter each half hour the next 2.5 hours. The temperature was 22° C.

187 mg/l: This dosage gives increasing colour to 225 Hazen after 3.5 hours. The colour did not vanish. Halogens were analyzed to 85 ppm after 1 hour.

375 mg/l: This dosage gives an increasing colour level to 300 Hazen after 25 minutes. Thereafter the colour level decreases and was 20 Hazen after 120 minutes. The halogen content was analyzed to 8 ppm after 1 hour.

750 mg/l: This dosage gives a maximum in colour intensity of 250 Hazen after 5 minutes, but decreases rapidly to 20 Hazen after 30 minutes. The halogen content was analyzed to <1 ppm.

1000 mg/l: This dosage gives the same result as 750 mg/l.

5000 mg/l: The dosage results in a very rapid reaction and the acid was clear and colourless, 20 Hazen, and without any indication of discolouring.

From this it can be seen that a correct dosage will be between 375 and 750 mg/l, i.e. about 500 mg/l for this content of halogens. This quantity results in a clear acid after about 30–40 minutes and the $Cl_2$ value is <1 ppm. With this quantity it is also included that natural variations in halogen/colour content can occur and that the mixing is not as good as in large scale.

The added dosage of the reducing agent will be dependent on the quantity of halogens present in the acid. However, generally it can be said that the reducing agent is added in excess compared to stoichiometric amount to obtain the wanted effect.

With this invention one has obtained a simple and cheap method that can be utilised in industrial scale and that gives a saleable product.

What is claimed is:

1. A method for removing iron and halogens from hydrochloric acid containing iron and halogens, which comprises removing iron from the hydrochloric acid and thereafter adding a nitrogen containing reducing agent to the acid, wherein the halogens comprise colouring amounts of each of chlorine and bromine.

2. The method according to claim 1, wherein a compound containing hydroxylamine is used as the reducing agent.

3. The method according to claim 2, wherein hydroxylamine hydrochloride is used as the reducing agent.

4. The method according to claim 1, wherein the reducing agent is supplied in excess compared to a stoichiometric quantity.

5. The method according to claim 1, wherein the iron is removed by filtration and ion exchange.

* * * * *